United States Patent [19]

Allison et al.

[11] 3,752,023

[45] *Aug. 14, 1973

[54] CUTTING APPARATUS AND METHOD

[75] Inventors: Rudolph L. Allison; Willy J. Goellner, both of Rockford, Ill.

[73] Assignee: Paramount Textile Machinery Co., Rockford, Ill.

[ * ] Notice: The portion of the term of this Patent subsequent to Mar. 23, 1988, has been disclaimed.

[22] Filed: Nov. 12, 1970

[21] Appl. No.: 88,547

Related U.S. Application Data

[63] Continuation-in-part of Ser. No. 838,220, July 1, 1969, Pat. No. 3,572,200.

[52] U.S. Cl.............................. 83/27, 83/107, 83/113, 83/466
[51] Int. Cl............................ B26d 7/06, B26d 7/02
[58] Field of Search.................... 83/27, 113, 129, 83/135, 154, 153, 282, 277, 110, 461; 214/1 BB; 143/46 F

[56] References Cited
UNITED STATES PATENTS

| | | | |
|---|---|---|---|
| 3,572,200 | 3/1971 | Allison et al............................ | 83/27 |
| 3,513,741 | 5/1970 | Shallenberg...................... | 83/210 X |
| 2,939,355 | 6/1960 | Sevison............................ | 83/277 X |
| 3,436,996 | 4/1969 | Toensing........................... | 83/153 X |
| 3,459,082 | 8/1969 | Smith et al............................ | 83/153 |
| 2,889,858 | 6/1959 | Roberts............................. | 143/46 F |
| 2,752,999 | 7/1956 | Gage...................................... | 83/276 |
| 3,426,631 | 2/1969 | Sandberg............................ | 83/82 |

*Primary Examiner*—J. M. Meister
*Attorney*—Burns, Doane, Swecker & Mathis

[57] ABSTRACT

A method and apparatus for severing a workpiece with a cutting tool returnable through the kerf or cut made thereby wherein at least one translatable slide is employed to move the uncut major portion of the workpiece in a generally linear direction away from the kerf prior to return of the cutting tool. Provision is made for predetermining the amount of translating movement of the slide in at least one generally linear direction of movement thereof in order to facilitate measuring operations.

The workpiece may be clamped against a support of the slide including a generally laterally extending supporting surface and a generally upwardly extending supporting surface with positive forces acting in two generally opposite directions, one acting generally downwardly of the slide and the other acting generally upwardly against a way on which the slide is supported.

28 Claims, 4 Drawing Figures

United States Patent [19]
Allison et al.
[11] 3,752,023
[45] *Aug. 14, 1973
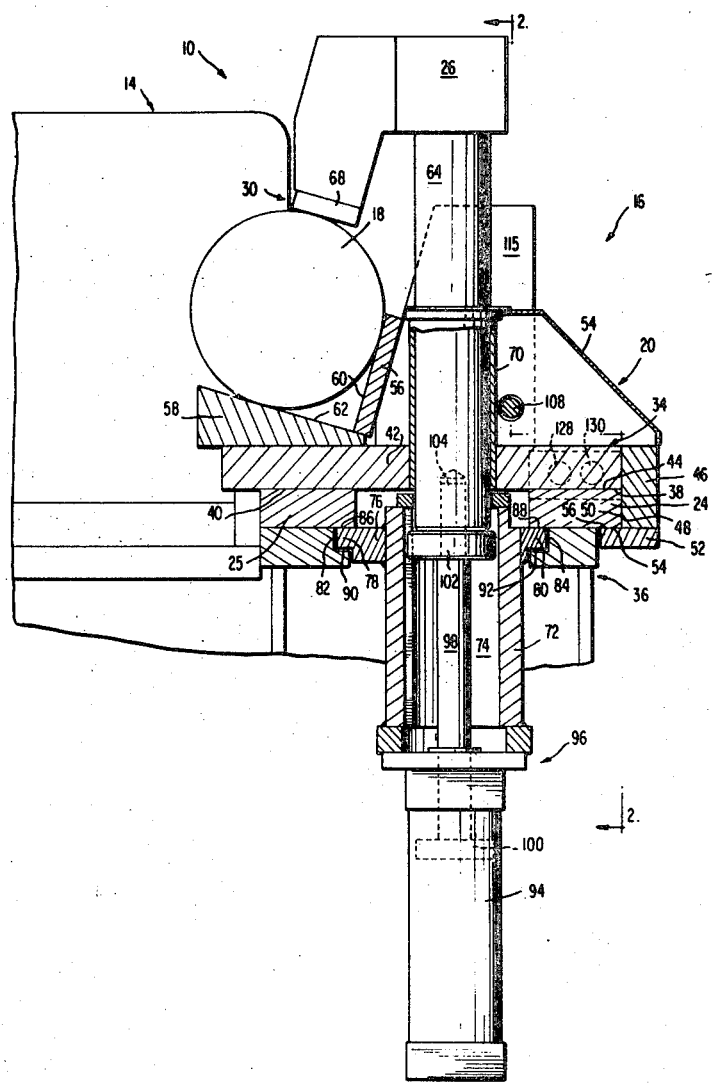

Patented Aug. 14, 1973

INVENTORS
RUDOLPH L. ALLISON
WILLY J. GOELLNER

BY *Burns, Doane, Benedict, Swecker & Mathis*

ATTORNEYS

Patented Aug. 14, 1973

INVENTORS
RUDOLPH L. ALLISON
WILLY J. GOELLNER

BY Burns, Doane, Benedict,
Swecker & Mathis
ATTORNEYS

CUTTING APPARATUS AND METHOD

RELATED APPLICATION

This application is a continuation-in-part of applicants' copending application Ser. No. 838,220, now U.S. Pat. No. 3,572,200, filed July 1, 1969 for "Method and Apparatus for Spreading Severed Portions of a Workpiece".

BACKGROUND OF THE INVENTION

This invention relates to cutting operations involving the return movement of a cutting tool through the kerf or cut made thereby. More particularly, this invention relates to a cutting apparatus and method wherein the severed portions of a workpiece are separated prior to return movement of the cutting tool.

Subsequent to the severance of a workpiece by a rotating or reciprocating cutter, it has been common for many years to return the cutting tool through the kerf or cut produced by the severance. Usually, the cutting tool is continuously driven during this return movement in order to avoid the need for restarting the machine prior to each cut.

Upon passage of the cutting tool through the kerf, the tool normally engages one or both of the severed portions of the workpiece. This engagement may result from the tendency of the workpiece to expand into the kerf in order to relieve compressive stresses induced by the cutting tool on the workpiece faces exposed by cutting, or from the actual shifting of the severed portions toward one another as a consequence of vibrations produced during the cutting operation.

At any rate, the cutting tool and workpiece interaction not only produces a significant amount of undesirable noise during the return stroke of the cutter, but also tends to mar the finish of the workpiece surfaces adjacent the kerf.

Moreover, the contact between the tool and the workpiece may significantly reduce the useful life of the tool.

In the past, many saw blades were constructed from high-speed steel, high-carbon steel, or abrasive material, all of which were relatively unaffected by the reverse rubbing action that occurs when the blade is retracted through a cut. However, with the advent of the relatively new saw-blade technology, involving carbide tips brazed onto the body of the saw blade, the reverse rubbing in a direction opposite to that of the cutting force may have a tendency to cause chipping of the corners of the carbide tips or breaking of the tips at the braze line.

Applicants' copending application Ser. No. 838,220 discloses a technique directed at overcoming problems of the type previously noted. In its broad aspects this technique is concerned with spreading the severed portions of a workpiece prior to the return of a cutter means through the path of the cut.

The preferred form of accomplishing this spreading as disclosed in the aforesaid copending application contemplates the provision of at least one translatable slide means generally linearly movable in generally opposite linear directions toward and away from the location at which the workpiece is severed. The slide is employed to translate a severed workpiece portion in a generally linear direction away from the cut and may be employed to return the severed portion of the workpiece to its initial position to facilitate measuring operations.

Of independent significance apart from the concept of spreading the severed portions of the workpiece is this translation feature disclosed in the aforesaid copending application, insofar as overall machine operation is significantly enhanced when substantially pure linear movement of severed workpiece portion is accomplished through the use of a translatable slide means. For example, if a spreading action of a pivotable type were to be employed to move the cut exposed end portion of the workpiece away from the location at which the cut were made, a small amount of pivoting of the leading portion of the exposed workpiece end (that portion closest to the pivot point) would necessitate a significantly greater amount of movement of the trailing portion of the exposed workpiece end. In other words to insure a clearance, for return of the cutter means, of a desired amount along the total extent of the severed end portion, a greater amount of clearance must be provided at severed end portion locations remote from the pivot point.

Thus, where severance of such workpieces as steel bar stock is involved (with 6-inches square cross-sectional dimensions and 30-feet length dimensions not being uncommon in heavy steel bar stock cutting), the pivoting of the bar stock to move the cut-exposed end of the workpiece away from the location at which severance occurred would include what may be an intolerable and significantly greater amount of movement of the workpiece at the other uncut end. A dangerous hazard may thereby be created at that remote uncut end to the degree that injury of personnel near that end of particularly long and heavy stock may occur. The hazard may be increased by the fact that the amount of travel of the uncut end would vary with the length of the workpiece.

It would, therefore, be desirable to minimize or obviate this problem through employing spreading procedures amenable to limited motion commensurate with the intended purpose.

In this connection, it should be noted that proper location of a pivot point for moving one end of a heavy and long workpiece away from the cut may produce other problems such as necessitating the application of an undesirable amount of force to induce pivoting. The force needed to move the bar not only must account for the "dead" weight of the bar but also would have to account for any friction forces that would be encountered. For example, when bar support assemblies of the conventional roller-type (as disclosed in the aforesaid copending application) are employed, the rollers, which offer little or no resistance to the feeding of the bar along the rollers, would offer frictional resistance along the entire length of the bar that would be forced to slide across, rather than along, the rollers during bar pivoting. This resistance would have to be overcome and may require the application of forces at unnecessarily high levels. Even if overcome, this resistance may tend to induce slippage of the workpiece portion gripped by any clamp.

It would, therefore, be desirable to provide for spreading procedures wherein spreading movement may be accomplished with minimal frictional resistance of the workpiece being encountered.

It would be particularly desirable to accomplish this end without the need for specialized material handling techniques, e.g., without the need for providing for pivotal movement of a conventional roller-type workpiece support assembly.

In eliminating problems associated with saw blade wear, particularly that of carbide tip saw blades used in cutting heavy metal stock material such as steel, the efficient positive maintenance of the workpiece in a rigid position during the actual severance of the workpiece would also be desirable. Blade chatter and the like and the resultant wear may thus be minimized. Applicants' copending application Ser. No. 838,220 discloses a clamping arrangement continuously available to positively clamp the workpiece against a support with forces acting from generally opposite sides, to thus positively maintain the clamped workpiece in a rigid posture. Such a clamp arrangement is particularly useful from a saw-blade life standpoint, in combination with spreading techniques, but is of independent significance.

OBJECTS AND SUMMARY OF THE INVENTION

It is therefore a general object of the invention to provide a method and apparatus that eliminates problems of the sort previously noted.

It is a particular object of the invention to provide a method and apparatus which efficiently eliminates interaction between a cutting tool and a workpiece during return movement of the cutting tool.

It is a related object of the invention to provide such a method and apparatus characterized by the generally linear movement of at least one of the severed workpiece portions away from the kerf.

It is still another object of the invention to provide an improved method and apparatus for cutting a workpiece with a cutting tool returnable through the kerf.

It is a particular object of the invention to provide such a method and apparatus wherein generally linear movement of a workpiece portion away from the location of the cut is employed while minimizing the amount of workpiece movement and force required for desired separation, as well as while avoiding potentially dangerous workpiece movement remote from that location and minimizing problems associated with any frictional resistance of the workpiece to movement.

It is a further object of the invention to provide such a method and apparatus compatible with conventional material handling techniques.

It is an independent object of the invention to provide an improved method and apparatus for severing a workpiece that utilizes a clamping assembly continuously available to efficiently maintain the workpiece in a rigid posture.

It is still another object of the invention to provide such a method and apparatus in conjunction with the procedures involving generally linear movement of at least one of the severed workpiece portions away from the kerf, or location of the cut.

It is a related object of the invention to provide such a method and apparatus wherein the severed work portions are positively clamped from generally opposite sides prior to the occurrence of separating movement.

A preferred embodiment of the invention intended to accomplish at least some of the foregoing objects involves a rotatable carbide tip saw blade translatable toward and away from a workpiece supported generally transversely to the direction of translation of the saw blade.

The support for the workpiece includes two translatable slides on each of which a releasable clamp is mounted. The slides and the clamps are positioned on opposite sides of the location where the cut is to take place. The slides are generally linearly movable in opposite linear directions toward and away from one another. The releasable clamps are continuously available to be operable to maintain the workpiece tightly against the slides by a clamping force applied in a first direction.

Also, the ways on which the slides are mounted are forced into tight engagement with the slides so as to clamp the workpiece against the slides from a generally opposite direction. This latter force inherently clamps the slides to the bed on which the ways are secured. The support against which the workpiece is clamped includes a generally L-shaped support shelf facing the cutting blade and comprised of a generally laterally extending surface beneath the workpiece and a generally upwardly extending surface on one side of the workpiece.

After severance of the workpiece and prior to the return of the saw blade through the kerf, a piston and cylinder assembly is activated to separate the slides by a predetermined amount, with each slide being moved by translation in a generally linear direction away from the kerf. With the severed workpiece portions clamped to the slides, these portions are also translated in a generally linear direction away from the kerf and from one another.

In order to facilitate the taking of measurements for a subsequent cut, there is a provision of means for predetermining the amount of translating movement of at least the slide that moves the major uncut portion of the workpiece, in at least one generally linear direction of slide movement. In the preferred embodiment of the invention this is accomplished by providing stop means that limits movement of each of the slides in generally opposite linear directions. In this fashion, a "zero" point from which a desired feed of the workpiece may be undertaken is established in two locations as will become apparent hereinafter. Thus, the clamps may be released and the feed of the workpiece may be accurately accomplished from the predetermined position where the uncut workpiece is located through the predetermined positioning of the slide away from the cut as a result of the provision of the stop means. The translatable slide may be subsequently returned to a position for later translating spreader action. Alternatively, subsequent to the return of the saw blade to its original position, the slides, and therefore the clamped severed portions of the workpiece may be returned to their initial positions in order to facilitate the taking of measurements.

THE DRAWINGS

Other objects and advantages of the present invention will become apparent from the following detailed description of a preferred embodiment of the invention as illustrated in the accompanying drawings in which.

DETAILED DESCRIPTION

General Summary

Figure 1:
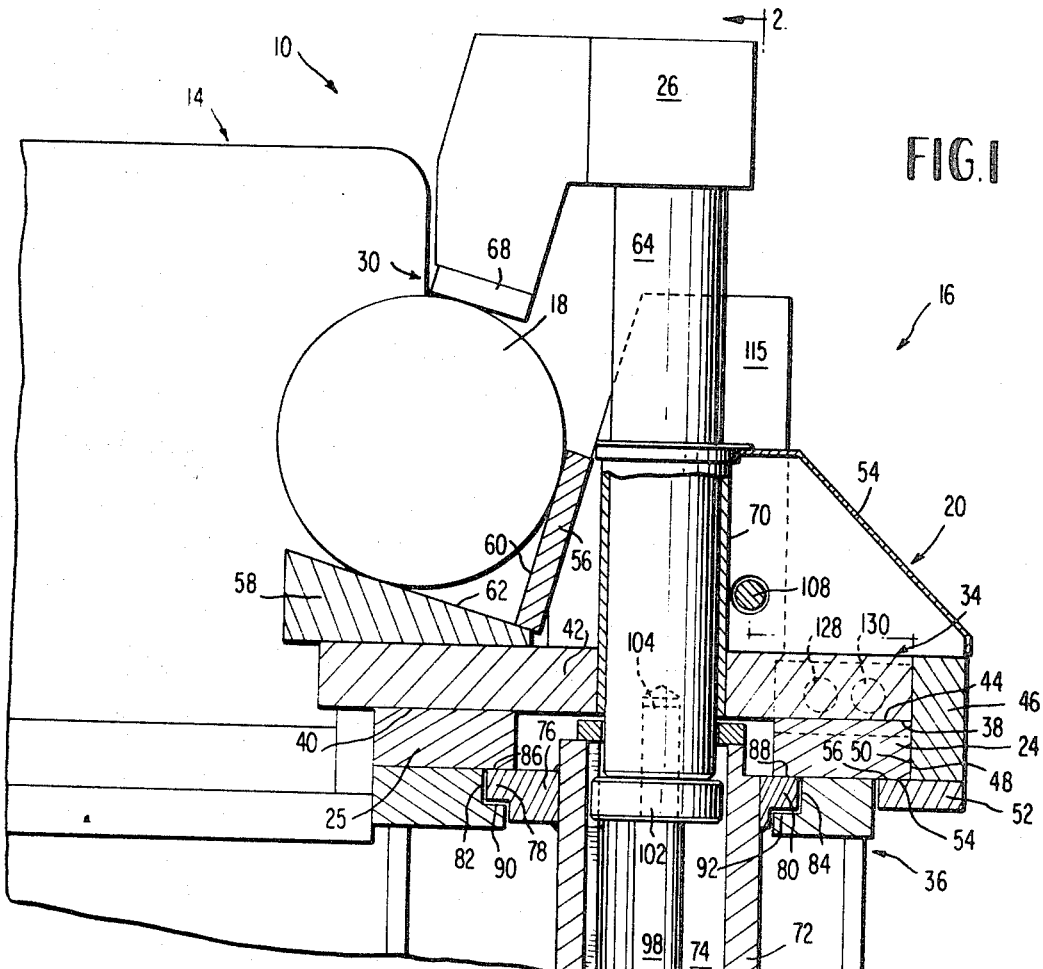
FIG. 1 is a partially cross-sectional side elevational view of a cutting machine according to the present invention.
Figure 2:
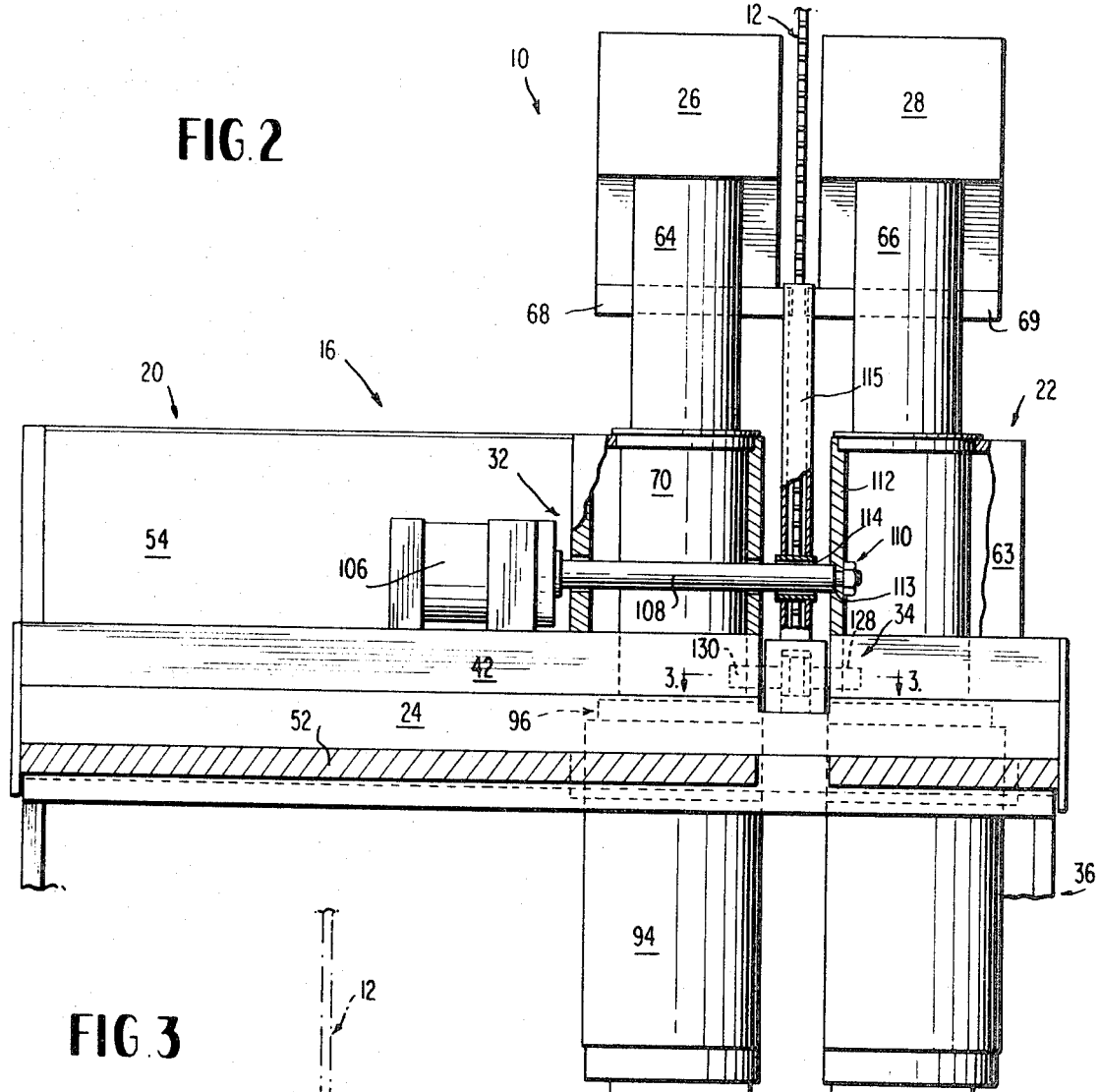
FIG. 2 is a partially cross-sectional, end elevational view taken along line 2—2 in FIG. 1.

Referring now to FIGS. 1 and 2, a cutting machine 10 according to a preferred embodiment of the present invention is there shown.

The cutting machine 10 includes a rotatable carbide tip saw blade 12 (FIG. 2) mounted for reciprocating movement on a slidable base 14. Any suitable motor means (not shown) may be employed to provide the translating and rotating movement of the saw blade 12. Anti-backlash gearing is particularly desirable for this purpose.

Disposed generally transversely of the path of translation of the saw blade 12 is a workpiece support assembly 16. This support assembly may include a roller-type support means (not shown) on which the major portion of a bar 18 of stock material rests. The end of this bar 18 is supported on each of two slides 20 and 22 (FIG. 2), with the slides being situated on opposite sides of the plane of translation of the saw blade 12, i.e., on opposite sides of the location at which the cut is to be made. Each slide is slidably mounted on spaced ways 24 and 25. It is readily apparent that the ways 24 and 25 serve to guide the slides 20 and 22 for translation therealong.

Extending upwardly from each of the slides 20 and 22 are first and second vices 26 and 28. It will be implicitly recognized from the foregoing that since the vices 26 and 28 and the hereinafter more fully described other elements of the clamping assemblies are mounted on the slides 20 and 22, they are continuously available for utilization throughout the operation of the cutting machine 10. Particular advantages, hereinafter more fully elaborated, inherently flow from this arrangement. At the time that it is desired to clamp the workpiece to the slides, the vices 26 and 28 may be lowered into engagement with the workpiece 18 as indicated at 30. If this clamping takes place subsequent to a cutting operation, the vices 26 and 28 may be lowered into engagement with the separated portions of the workpiece 18. If desired, the ways 24 and 25 may be forced tightly against the bottom portions of the slides 20 and 22 to insure positive clamping of the workpiece against the slides, in a manner hereinafter more fully described.

Prior to the return of the saw blade 12 through the kerf and to its initial position, the slides 20 and 22, and therefore the severed work portions clamped thereto, are separated by operation of a piston and cylinder assembly 32 (FIG. 2). After the saw blade has been returned through the kerf, the slides and the severed portions of the workpiece are returned to their initial positions by reversing the operation of the piston and cylinder assembly 32. With the ways 24 and 25 serving to guide the slides 20 and 22 for translation, the piston and cylinder assembly 32 functions as means for respectively moving the slides and the severed portions of the workpiece if clamped thereto, in generally linear directions toward and away from one another and therefore toward and away from the location of the cut. It will be appreciated that this linear motion of the translating slides allows for minimization of the amount of workpiece movement and forces needed for desired separation of the severed workpiece portions. Moreover the minimal linear movement of the severed portions at their adjacent cut exposed ends is inherently reflected at the remote ends of those portions. Thus, where long length heavy workpieces such as 30-feet long and 6-inches square steel bar stock are employed, a potentially dangerous situation of workpiece movement at the remote end (that would be involved with large movements at the remote end of the long workpiece) is avoided.

Moreover, the frictional resistance offered to movement of the major uncut portion of the workpiece may be minimized, particularly in conjunction with the previously mentioned roller-type support means on which the major portion of the bar 18 of stock material rests. This, of course, minimizes the force needed to move that workpiece portion, while avoiding the likelihood that the frictional resistance will cause that workpiece to become unclamped. In this connection it may be noted that the linear motion of the slides and workpiece is compatible with such a conventional material handling technique as the roller-type support means and no special provision need be made, for example, for pivoting of that support assembly.

A stop member 34 (FIGS. 3 and 4) is provided between the slide members 20 and 22 to limit the movement of the slide members in both directions. It is readily apparent that this feature is particularly amenable to enhancing measuring operations. When the next cut is to be made in an operation wherein the end portion of the workpiece is to be sequentially severed from the remainder thereof, it is often desirable when taking any direct measurements for a subsequent cut or when feeding the workpiece by a desired amount for a subsequent cut, to take such a direct measurement or commence such measured feeding from the location at which the cut was made. Thus, since the linear movement of the slide members 20 and 22 toward the cut is limited by the stop member 34, this stop limit, when commensurate with the piston from which the slide was originally moved, provides a convenient zero point for measurements or feeding operations when the slides are operable to translate the severed work portions to their initial positions.

In a similar manner the limit to the translating movement of the slide in the opposite direction (i.e., away from the location of the cut) provided by the stop member 34 may, if desired, provide such a zero point. It will be apparent that since the vices 26 and 28 can be released after movement to that point, feeding can be accomplished from that point with the amount of feed required to correctly position the workpiece for a specified length of cut compensating for the amount of previous translation of the workpiece away from the cut.

The stop member 34 thus inherently functions as a means for predetermining the amount of movement of the slides in both directions. It will be appreciated that measuring accuracy can readily be enhanced with such predetermination of one slide movement in only one direction.

Detailed Structure and Method of Operation

Referring again to FIGS. 1 and 2, it will be seen that the workpiece support assembly 16 includes a stationary base member 36 in addition to the slide members 20 and 22 and ways 24 and 25. The ways 24 and 25 are bolted or otherwise secured to this stationary base member 36. The mounting of the ways on the base member 36 is such that the ways are supported in a generally horizontal position to present flat, upper guide surfaces 38 and 40.

The slide 20 is supported for movement on the ways by means of a first reciprocable or tanslating member 42. This reciprocable member 42 is provided with a flat bottom surface 44 which rests on the upper way surfaces 38 and 40 and is slidable relative thereto.

Fixed to the first reciprocable member 42, at the end thereof remote from the slidable base 14 on which the saw blade 12 is mounted, is a second reciprocable member 46. This second reciprocable member presents a generally vertically extending, flat, slidable surface 48 which slides along a similarly oriented surface 50 of the way 24 remote from the saw 12. A third reciprocable member 52 is fixed to the second reciprocable member 46 and presents an upper slide surface 54 that slidably engages a portion of the lower surface 56 of the way 24 which projects outwardly beyond the stationary base member 36. Thus, the reciprocable members 42, 46 and 52 define a channel in which the way 24 is received for relative slidable, translating movement. It will be apparent that the second slide 22 is provided with similar reciprocable members oriented to define a substantially identical way receiving channel, with this latter channel having a lesser longitudinal or linear extent along the way 24 than that of the channel of the first slide member 20.

The upper portion of the slide member 20 includes a hollow housing 54 that is generally trapezoidal in cross-section. This housing is fixed to the first and second reciprocable members 42 and 46 for movement therewith. Along the surface of the housing 54 facing the saw blade 12 a generally upwardly extending member 56 of a workpiece support shelf is attached in any suitable manner. A generally laterally extending member 58 of this support shelf is fixed to the first reciprocable member 42. These members 56 and 58 of the support shelf respectively present vertically and horizontally inclined and contiguous surfaces 60 and 62 offset by substantially a right angle. As will be recognized, this arrangement makes the support shelf readily and advantageously amenable to use with either rectangularly or circularly cross-sectional workpieces. As may be seen in FIG. 1, the support shelf facing the saw blade 12, and defined by the generally upwardly extending member 56 and its generally upwardly extending support surface 60 along with the generally laterally extending member 58 and its generally laterally extending support surface 62, is generally L-shaped. The one surface 62 is beneath the workpiece and the other surface 56 is alongside the workpiece. The end portion of the workpiece 18 which is to be severed during a cutting operation is supported by these surfaces 60 and 62.

It will be recognized that the clamping action on the workpiece 18 is operative to provide a clamping force to urge the workpiece against both of these surfaces 60 and 62 to thereby rigidify the position of the workpiece 18 on the generally L-shaped support. Moreover, the generally L-shaped support inherently reacts against the force provided by the facing saw blade 12 during the actual cutting operations. This, of course, implicitly minimizes any workpiece movement during severance so as to enhance blade life. Anti-backlash gearing driving the blade 12, may further enhance blade life.

It will be appreciated that the second slide member 22 includes a hollow housing 64 and support shelf (not shown) substnatially identical to the corresponding portions of the first slide member 20 but having a lesser longitudinal extent along the workpiece 18.

Extending upwardly through each of the slides 20 and 22 adjacent the juxtaposed ends thereof are first and second rods 64 and 66. These rods are respectively attached, at their upper ends, to the previously identified vices 26 and 28 which are disposed so as to present clamping surfaces 68 and 69 over the workpiece support surfaces.

The rod 64 is slidably received within a cylinder 70 extending through the hollow slide housing 54 and the upper reciprocable base member 42. Positioned below the cylinder 70 and between the ways 24 and 25, is a hollow, floating sleeve 72 having an internal chamber 74 substantially concentric with the cylinder 70.

This sleeve 72 is provided with an external collar 76 having longitudinally extending flanges 78 and 80 on opposite sides thereof. The flanges 78 and 80 are received in channels 82 and 84. These channels 82 and 84 are defined by oppositely facing and generally L-shaped cutouts in the upper portion of the stationary base 36 of the workpiece support assembly 16 together with the downwardly facing surfaces 86 and 88 of the ways 24 and 25, which downwardly facing surfaces project inwardly of the base 36 toward one another.

As indicated at 90 and 92, the thickness of the flanges 78 and 80 is such that a degree of clearance exists to permit slight vertical movement of the flanges within the channels 82 and 84. Preferably, the amount of clearance is on the order of 1/32 of an inch. However, for purposes of illustration, the clearance is exaggerated in FIG. 1.

Suspended from the floating sleeve 72 is a hydraulic cylinder 94. This cylinder is generally coaxial with the sleeve 72 and is fixed at its upper end 96, to the floating sleeve for movement therewith, thereby to render the cylinder of a floating nature.

A piston rod 98 extends into the chamber 74 of the sleeve and into the hydraulic cylinder 94 where it is attached to a piston 100. At the sleeve end the piston rod 98 is connected to a slidable piston-like member 102 having a diameter substantially equal to that of the sleeve chamber 74. This member 102 is fixed to the lower end of the vice connecting rod 64 by any suitable means such as a threaded bolt 104.

To clamp the workpiece, fluid under pressure is supplied to the upper end of the cylinder 94 from any suitable source (not shown). This causes downward movement of the piston 100 which ultimately moves the clamping surface 68 of the vice 26 into engagement with the workpiece. At this point, the reaction force to the fluid pressure acting on the piston 100 causes upward movement of the floating cylinder 94 and floating sleeve 72 (permitted by the clearances 90 and 92 in the channels 82 and 84). A force against the ways is thereby provided by the flanges 78 and 80 acting on the lower, inwardly projecting way surfaces 86 and 88.

Thus, as a result of the movement of the floating cylinder 94 and floating sleeve 72, a second positive clamping force is provided between the workpiece 18 and the slide member 20, which force acts in a direction generally opposite to that of the force provided by the vice 26. This arrangement insures positive engagement between the slidable surface 44 of the first reciprocable member 42 and the upper surfaces 38 and 40 of the ways anchored to the bed 36, by reason of forces acting in two generally opposite direction.

In instances wherein there is a limited amount of play of bolts securing the ways to the stationary bed 36, or in instance of way warpage or the like, the generally upward clamping force provided by the floating cylinder assembly may induce a relative vertical movement between the ways and the slide member 20, which was recognized in the aforementioned copending application and may be conveniently referred to as upward movement of the ways 24 and 25 against the first slidable support surface 42. However, whether or not this phenomenon occurs, it is apparent that disclosed arrangement operates to take play out of the system through the generally oppositely acting clamping forces. One force acts directly against the workpiece and forces the slide against the ways mounted on the stationary bed 36, while another generally upward positive clamping force acts against the ways as may be clearly seen in FIG. 1. The slide 20 is thus inherently clamped to the stationary bed 36 on which the ways are secured.

It will be apparent that the second slide member 22 is provided with an arrangement to exert clamping forces in a manner identical with that described in connection with first slide 20. The clamping assemblies being continuously available for clamping action by reason of their being carried on the translatable slide members 20 and 22, may be activated when desired. This activation of course occurs prior to separation of the slide members, and subsequent to the completion of a prior cutting operation, i.e., after feeding for the next cutting operation has been accomplished. Activation may be advantageously initiated immediately prior to severance so that the workpiece remains clamped during severance. In this manner the maintenance of the workpiece in a rigid posutre and the stabilization, with the oppositely directed clamping forces, of the slides relative to the ways secured to the station bed 36, throughout the actual severance, help to minimize chatter caused by workpiece "play" and enhance blade life. Where activation occurs subsequently to the immediately proceeding severing operation, it is desirable to maintain the workpiece in a clamped position through a feeder clamp of any suitable type which would normally be used in connection with the positioning of the workpiece for severance.

At any rate, the severed portions of the workpiece are clamped to the slides 20 and 22 and before the saw blade 12 is returned through the kerf of the cut, the slides 20 and 22 and, therefore the supported workpiece portions are separated by the previously identified piston and cylinder assembly 32. It will be appreciated that this piston and cylinder assembly is of course operative to produce a translating spreading force that supersedes any resistance to spreading produced by the stabilization of the slides on the ways with the oppositely directed clamping forces.

The piston and cylinder assembly includes a hydraulic cylinder 106 (FIG. 2 fixedly mounted in any convenient manner, in one of the hollow housings 54 of one slide member 20 on the upper reciprocable member 42. Extending outwardly from this housing 54, behind the cylinder 70 which receives the vice connecting rod 64, is a piston rod 108. This rod 108 is bolted, as shown at 110, or otherwise secured to the internal portion of the end wall 112 of the other hollow housing 64, which wall 112 faces the first hollow housing 54. The rod 108 is additionally provided with a shoulder 113 which bears against a pocket in the outer surface of the end wall 112 to which it is secured.

Between the slides 20 and 22 the rod extends through registered apertures 114 in a U-shaped shield 115 which opens toward the saw blade 12.

When fluid pressure is applied from any suitable source (not shown) to the cylinder 106 to tend to telescope the piston 108 outwardly thereof, the slides tend to move by translating away from one another along the ways 24 and 25. The linear movement of the slides is guided by these ways, particularly in connection with the earlier noted channels defined by the reciprocable members 42, 46 and 52. The previously identified stop member 34 is disposed on the way 24 remote from the saw blade 12 and between the slides 20 and 22.

Figure 4:
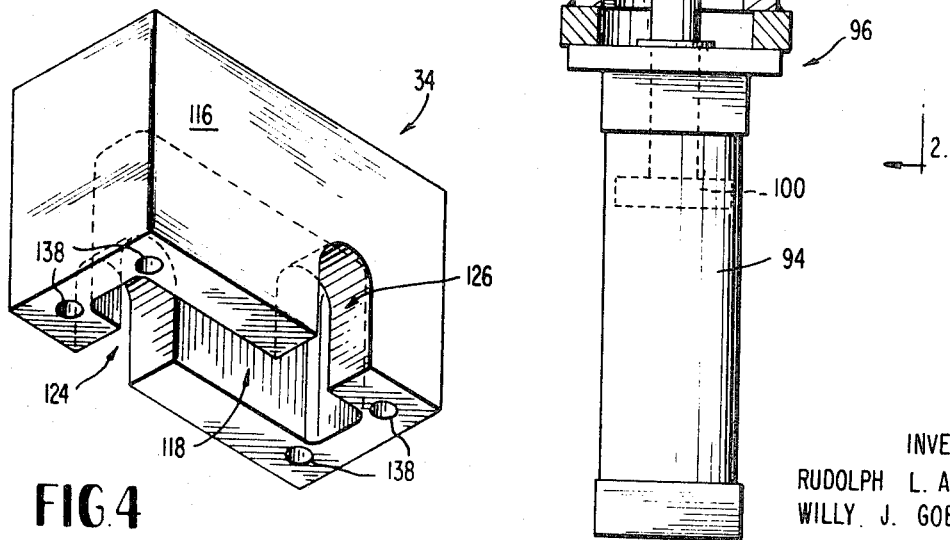
FIG. 4 is an inverted perspective view of the stop means shown in FIG. 3.
Figure 3:
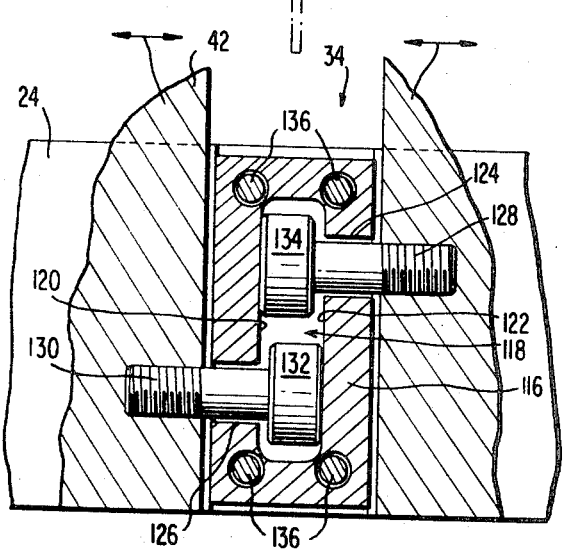
FIG. 3 is a partially cross-sectional, top plan view of the stop means taken along line 3—3 of FIG. 1.

Referring now to FIGS. 3 and 4, it will be seen that this stop member 34 comprises a block 116 having a vertically extending slot 118 within. The opposite side walls 120 and 122 defining the slot 118 provide abutments for limiting the movement of the slides 20 and 22. On each side of the block is a transverse, generally U-shaped access opening 124 and 126 communicating with the slot 118. These access openings 124 and 126 are laterally offset from one another.

The threaded shanks 128 and 130 of the first and second screws are attached respectively to the upper slidable support members 42 of the slides 20 and 22 and project into the access openings 124 and 126. The screws are provided with enlarged flat heads 132 and 134 which alternately abut the opposite walls 120 and 122 of the slot 118 to prevent excessive movement of the slides in either direction.

It will be appreciated that upon retraction of the saw blade 12 through the kerf, the return translating movement of the slides caused by reverse pressurizing of the cylinder 106 of the piston and cylinder assembly 32 resutls in the abutment between the flat head 132 and 134 and the slot walls 120 and 122 so as to insure the return of the slides (and therefore the severed portions of the workpiece) to their initial positions. This facilitates the taking of accurate measurements prior to proceeding with the next cutting operation. In the subsequent cutting operations involving the sequential severing of the end portion of the workpiece from the remainder thereof, it will be apparent that the entire foregoing technique, including, the support of the workpiece in a position for severance, is repeated.

The block 116 is received within a pocket 137 in the way 24 and is securely fastened thereto by means of bolts 136 extending through longitudinal apertures 138 in the corners of the block so that repeated separating and return action of the slides 20 and 22 always results in proper positioning of the severed workpiece portions.

SUMMARY OF ADVANTAGES AND SCOPE OF THE INVENTION

It will be seen that following the present invention, an improved cutting apparatus and cutting method are provided so as to minimize problems associated with the return of a cutting tool through the kerf by separating the severed portions of the workpiece prior to that return.

The provision of translating spreading action to generally linearly move the uncut workpiece portion away from the location of the cut advantageously minimizes the amount of workpiece movement and force required for separation. Since a spreading action involving limited motion commensurate with the intended purpose is provided, problems which may be associated with the movement of the remote workpiece end are minimized. Moreover, the linear movement particularly in conjunction with a roller-type support minimizes frictional resistance problems.

Of independent importance is the efficient positive maintenance of the workpiece in a rigid position through the provision of the clamping arrangement continuously available to provide positive clamping forces in two generally opposite clamping directions. To this end the floating sleeve, that stabilizes the slides on the ways and minimizes the possibility of undersirable movement of the workpiece by providing positive clamping of the workpiece to the slide members with forces acting in generally opposite directions, may be employed. The support surfaces beneath and alongside the workpiece provide related advantages.

Also significant is the provision of means for predetermining the amount of translating movement of at least one of the slides in at least one linear direction of movement thereof in order to facilitate measuring operations. This may be readily accomplished by the use of stop means to insure the return of at least the uncut portion of the workpiece to its initial position, subsequent to return of the cutting means.

It will be appreciated that these advantages may be realized with apparatus other than that specifically described. For example, pneumatic rather than hydraulic cylinders, as well as any other suitable motor force, may be employed to provide the separating force for the slides and/or the clamping forces on the severed workpiece portions.

It will also be appreciated that, if desired, the slide associated with the severed end portion of the workpiece remote from the bulk of the remaining stock material may be dispensed with and replaced by any suitable conveyor means for removing this workpiece portion, insofar as measuring operations may not require return of this portion to its original position.

Moreover, clamp means or slide means of a type other than those specifically illustrated may be employed without departing from the spirit of the invention.

It is also to be noted that the method and apparatus of the present invention are applicable to cutting operations in involving saw blades other than the carbide tip type, as well as to those cutting operations which involve translation of the workpiece toward the blade during cutting and/or those operations which employ reciprocating cutting tools rather than rotating cutting tools.

Therefore, it is apparent that although the invention has been described in connection with one preferred embodiment and method, additions, modifications, substitutions and deletions, such as those mentioned above, as well as others not specifically described, may be made therein without departing from the spirit of the invention.

What is claimed is:

1. In a machine for severing a workpiece by cutter means movable relative to and generally transversely of the workpiece to make a cut, and returnable relative to the workpiece through the path of the cut, the improvement comprising:
    spreader means for translating each of the severed portions of the workpiece in generally opposite linear directions away from one another prior to return of said cutter means, relative to the workpiece, through the path of the cut, said spreader means comprising:
        first and second translatable slide means supported for translationn on a way and positioned on opposite sides of the path of the cut, said slide means being generally linearly movable in generally opposite linear directions toward and away from one another,
        first and second clamp means, operatively connected respectively to said first and second translatable slide means, for clamping said workpiece to said first and second translatable slide means, each of said first and second clamp means including means for clamping said workpiece against the operatively connected one of said slide means with a first clamping force acting against said workpiece in a first positive clamping direction and a second positive clamping force acting against said way in a second generally opposite clamping direction,
        means for respectively translating said first and second slide means and the operatively connected one of said first and second clamp means, in generally opposite linear directions away from one another, and
        means for respectively translating said first and second slide means in generally opposite linear directions toward one another.

2. The improvement according to claim 1 including:
    means for predetermining the amount of translating movement of each of said translatable slide means in at least one generally linear direction of movement thereof.

3. The improvement according to claim 2 wherein said means for predetermining the amount of translating movement of each of said translatable slide means in at least one generally linear direction of movement comprises:
    stop means for limiting the amount of translating movement of each of said slide means in each of said generally opposite linear directions.

4. The improvement according to claim 1 wherein said means for respectively translating said first and second translatable slide means in generally opposite linear directions away from one another and said means for respectively translating said first and second translatable slide means in generally opposite linear directions toward one another comprise:
    cylinder means fixedly attached to said first translatable slide means, and
    piston rod means fixedly attached to said second translatable slide means, at least a portion of said piston rod means being slidably mounted in said cylinder means for relative movement with respect thereto.

5. The improvement according to claim 1 wherein:
    each of said slide means is comprised of a generally L-shaped support shelf facing said cutter means and including a generally upwardly extending support surface and a generally laterally extending support surface, and wherein each of said clamp means is operative to exert a clamping force to urge said workpiece against an adjacent set of both said generally upwardly extending support surface and said generally laterally extending support surface.

6. The improvement according to claim 5 wherein:

said generally upwardly extending support surface and said generally laterally extending support surfaces are respectively vertically and horizontally inclined.

7. The improvement according to claim 1 wherein said first and second clamp means each further comprise:

piston and cylinder means including floating cylinder means operative to provide said second clamping force in response to application of said first clamping force.

8. A cutting apparatus for sequentially severing the end portion of a workpiece from the remainder thereof, the apparatus comprising:

support means for supporting the workpiece;

cutter means, movable relative to the workpiece, for severing the workpiece into first and second portions, said cutter means being returnable, relative to the workpiece, through the cut made thereby:

translatable slide means, mounted for translation on a way secured to a stationary base member, for generally linearly moving one of said severed portions in a generally linear direction away from said cut, said translatable slide means including at least a portion of said support means and further comprising clamp means for positively urging said workpiece into engagement with said at least a portion of said support means and for stabilizing said slide means on said way, with a first clamping force acting in one clamping direction on said workpiece and positively urging said slide against said way, and with a second clamping force acting in a second clamping direction against said way; and means for respectively translating at least said translatable slide means in said generally linear direction and in a linear direction generally opposite thereto.

9. The cutting apparatus according to claim 8 wherein said clamp means comprises:

piston means for clamping said workpiece against said at least a portion of said support means from one of said generally opposite clamping directions, and floating cylinder means for clamping said workpiece against said support means from the other of said generally opposite clamping directions in response to clamping action of said piston means.

10. The cutting apparatus according to claim 8 wherein said at least a portion of said support means comprises:

a generally L-shaped support shelf facing said cutter means and including a generally upwardly extending support surface and a generally laterally extending support surface, said clamp means being operative to exert a clamping force to urge said workpiece against both said generally upwardly extending support surface and said generally laterally extending support surface.

11. The cutting apparatus according to claim 10 wherein:

said generally upwardly extending support surface and said generally laterally extending support surface are respectively vertically and horizontally inclined and offset by about 90°.

12. The cutting apparatus according to claim 8 including:

means for moving the other of said severed portions of said workpiece away from said cut.

13. The cutting apparatus according to claim 12 wherein:

said means for moving the other of said severed portions of said workpiece away from said cut comprises a second translatable slide means.

14. The cutting apparatus according to claim 8 including:

means for predetermining the amount of linear movement of said translatable slide means in at least one linear direction of translation.

15. The cutting apparatus according to claim 14 wherein said means for prdetermining the amount of linear movement said translatable slide means in at least one linear direction of translation comprises:

stop means for limiting translating movement said translatable slide means and cooperable with said slide means for returning said one severed portion to its initial position.

16. A cutting apparatus for sequentially severing the end portion of a workpiece from the remainder thereof, the apparatus comprising:

support means for supporting the workpiece;

cutter means, movable relative to the workpiece, for severing the workpiece into first and second portions, said cutter means being returnable, relative to the workpiece, through the cut made thereby;

translatable slide means, including at least a portion of said support means integral therewith and mounted on a way secured to a stationary base member, for generally linearly moving one of said severed portions in a generally linear direction away from said cut and in a direction transverse to the path of movement of said cutter means;

clamp means for clamping said workpiece to said at least a portion of said support means included in said translatable slide means and operative to clamp said workpiece and said slide means to said stationary base member, said clamp means including a first movable member for exerting a clamping force urging said workpiece against said at least a portion of said support means and for urging said slide means against said way in one clamping direction, and a second movable member for exerting a clamping force against said way in a generally opposite clamping direction; and means for respectively translating at least said translatable slide means in said generally linear direction and in a linear direction generally opposite thereto.

17. The cutting apparatus according to claim 16 wherein:

said at least a portion of said support means included in said translatable slide means is comprised of a generally L-shaped support shelf facing said cutter means and including a generally upwardly extending support surface and a generally laterally extending support surface, and wherein said clamp means is operative to exert a clamping force to urge said workpiece against both said generally upwardly extending support surface and said generally laterally extending support surface.

18. The cutting apparatus according to claim 16 wherein said first and second movable members are comprised of:
piston means and floating cylinder means, said floating cylinder means being operable to exert a clamping force in one of said clamping directions in response to the application of a clamping force by said piston means in the other generally opposite, one of said clamping directions.

19. A cutting apparatus for severing a workpiece, the apparatus comprising:
carbide tip cutter means, movable relative to the workpiece for severing the workpiece into first and second portions, said cutter means being returnable, relative to the workpiece, through the cut made thereby;
at least one translatable slide means generally linearly movable in two generally opposite linear directions, for linearly moving a severed portion of the workpiece away from said cut;
a way on which said translatable slide means is slidably mounted; and
clamp means mounted on said slide means and continuously available to clamp the workpiece to said slide means and to stabilize said slide means on said way, said clamp means including:
first movable means for urging said workpiece against said slide means and said slide means against said way with a clamping force acting in one clamping direction, and
second movable means for clamping said slide means to said way with a clamping force acting on said way in a second clamping direction.

20. The cutting apparatus according to claim 19 wherein said first and second movable means comprise:
piston means and floating cylinder means with the floating cylinder means being operable to exert a clamping force in one clamping direction in response to the exertion of a clamping force by said piston means in a generally opposite clamping direction.

21. The method for sequentially severing the end portion of a workpiece from the remainder thereof with a cutter relatively translatable with respect to the workpiece, the method comprising:
supporting the workpiece, at least partially on slide means slidable on a way, in a position generally transverse to the direction of relative translation of a cutter means;
translating the cutter relative to the workpiece to sever the workpiece into first and second portions;
spreading the severed portions of the workpiece, the step of spreading comprising clamping the workpiece and translating a clamped severed portion in a generally linear direction away from the location of the cut made by the cutter, and further comprising stabilizing the slide means on the way with first and second clamping forces acting against the slide means and the way in generally opposite clamping directions;
returning said cutter, relative to the workpiece, through the cut made thereby, and
positioning the workpiece for the next severing operation.

22. The method according to claim 21 including the steps of:
translating the clamped severed portion in a linear direction generally opposite to said linear direction, and
stopping the translating movement of the clamped severed portion in said generally opposite linear direction at its initial position.

23. The method according to claim 21 wherein the supporting step comprises:
supporting the workpiece against both a generally upwardly extending support surface and a generally laterally extending support surface each facing the cutter.

24. The method according to claim 23 wherein the clamping step comprises:
urging the workpiece against both the generally upwardly extending support surface and the generally laterally extending support surface.

25. The method according to claim 21 wherein the spreading step comprises translating another clamped severed portion in a generally linear direction away from the location of the cut, the method further comprising:
returning, by translating in linear direction generally opposite to the linear direction of movement during spreading, each of the clamped severed portions of the workpiece to its initial position.

26. A method for severing a workpiece with a carbide tip cutter relatively movable with respect to the workpiece, the method comprising:
supporting the workpiece in a position generally transverse to the direction of movement of the cutter means relative to the workpiece;
moving the cutter relative to the workpiece to sever the workpiece into first and second portions;
clamping the workpiece to a portion of its support on a translatable slide slidable on a way, with positiive clamping forces acting in two generally opposite clamping directions and provided by clamp means continuously available to apply a first clamping force to urge the workpiece against the slide means and the slide means against the way and to apply a second stabilizing clamping force exerted against the way.
translating at least one severed portion of the workpiece in a generally linear direction away from the cut made by the cutter; and
returning the cutter relative to the workpiece through the cut made thereby.

27. The method according to claim 26 wherein:
the clamping step is performed prior to severance of the work-piece and the clamping forces are operable during severance of the workpiece.

28. The method according to claim 26 wherein:
one of the clamping forces applied in one of the clamping directions is applied in response to application of the other clamping force in the generally opposite clamping direction.

* * * * *